Patented Oct. 15, 1935

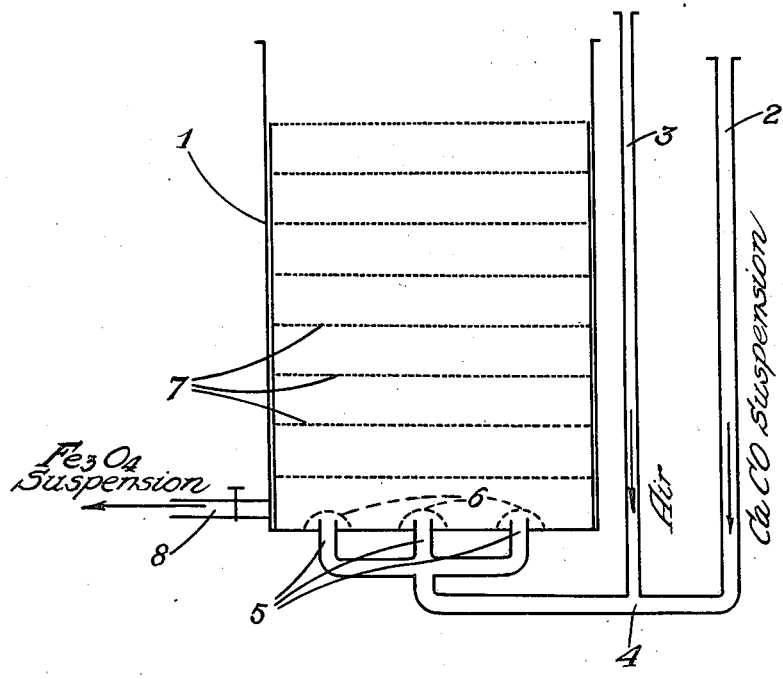

2,017,540

UNITED STATES PATENT OFFICE 2,017,540

PROCESS OF TREATING ZINCIFEROUS SOLUTIONS

Joseph Kemp, Brussels, Belgium

Application January 23, 1932, Serial No. 588,367
In Belgium January 27, 1931

6 Claims. (Cl. 23—200)

This invention relates to the treatment of solutions containing salts of iron, zinc and other metals, for the recovery of the same. In dealing with solutions of this nature, the separation of the iron from the other metals is attended by considerable practical difficulties. Iron may be caused to precipitate as ferrous hydrate by reaction with lime or with an alkali, but the precipitate thus obtained is so light and bulky that its separation, by decantation or filtration, cannot be effected satisfactorily on an industrial scale. No better results have been obtained with other processes hitherto proposed.

It has also been proposed to precipitate the iron by the addition of calcium carbonate in a divided condition, while blowing in air. The reaction, however, is slow; heating has been proposed in order to accelerate same, but is not convenient.

The present invention is based on the recognition that if in the presence of an earth alkaline carbonate in powder form, air is introduced into the solution in an abnormally fine state of division, and this state of division is maintained throughout the solution so that every portion thereof is pervaded by atomized air, a result is obtained which is different from that produced when the air is simply blown into the solution in the usual way, this new result being the conversion of the iron of the ferrous salt or salts present into ferroso-ferric oxide $Fe_3O_4$ in the form of a crystalline and compact precipitate of high specific gravity, easily separable from the solution.

According to my invention, the ferrous and zinciferous solution is subjected to oxidation in the presence of an earth-alkaline carbonate, under conditions adapted to result in the production of a ferroso-ferric oxide precipitate.

The oxidizing agent preferably used is atmospheric oxygen, a very finely divided jet of air being passed into the solution to which powdered calcium carbonate has been added, for example, and said air being caused to bubble therein so as to distribute the same uniformly throughout the mass. An abnormally fine division of the air has been found necessary for the performance of this process in order to reach the desired degree of oxidation.

Within the solution a reddish-brown and very dense precipitate is thereupon formed, disclosing under analysis the constitution of ferroso-ferric oxide. There is further formed in the solution a calcium salt corresponding with the acid radical of the ferrous salt displaced by precipitation, whilst carbon dioxide is generated. The zinc salts present in aqueous solution remain unaltered therein.

Since the ferroso-ferric oxide precipitate is extremely heavy, it settles quickly and the liquid containing the zinc salts may therefore be separated easily, by simple decantation and washing. When dried at a moderate temperature, said precipitate has the appearance of a fine brown ochre and is adapted to be converted into red ochre by being slightly roasted. The calcium sulphate precipitated together with the ferroso-ferric oxide is preferably allowed to remain mixed with the latter, and endows the same with a covering power adapted to enhance its value for coating purposes.

The clear solution obtained by decantation, containing all of the zinc salts, may be treated by the usual methods for the recovery therefrom of crystallized zinc salts, of zinc oxide, of zinc carbonate, of lithopone and the like.

The effective quantity of calcium carbonate required to displace iron by precipitation is proportional to the iron content, and it is therefore necessary to assess said requisite quantity of calcium carbonate by previously ascertaining the iron content of the solution to be treated, for the reason that immediately upon the elimination of said iron any excess of calcium carbonate would cause the precipitation of a corresponding quantity of zinc oxide.

The process according to my invention will now be described in greater detail, as an example of its application to the treatment of residual waters resulting from the chlorination of zinciferous copper pyrites. After copper has been eliminated from said waters by causing them to pass over iron scrap, they contain ferrous sulphate and chloride, zinc sulphate and chloride, sodium sulphate and chloride and sometimes traces of manganese, in quantities which vary according to the nature of the ore under treatment.

The iron content of the waters to be treated and consequently the precise quantity of calcium carbonate to be used having been determined by analysis, said waters are passed into a bubbling apparatus fed with air under pressure.

In the accompanying drawing, which illustrates diagrammatically and by way of example a suitable apparatus for carrying into effect the process according to my invention, 1 denotes a container wherein the reaction is effected, 2 is a compressed-air feed-pipe, and 3 is a pipe for feeding into said tank calcium carbonate, previously mixed with the solution to be treated or with a portion of the same. Such calcium carbonate may conveniently be in the form of ground chalk or of finely crushed calcareous stone.

The pipes 2 and 3 unite at 4, the air and the liquid charged with calcium carbonate commingling and being discharged into container 1 through a plurality of nozzles 5, arranged symmetrically in the bottom of the same. Said nozzles 5 are covered by perforated caps 6, which act as atomizers to distribute the air as equally as possible throughout the mass. The air is still more finely divided by arranging within container 1 a plurality of superimposed trays 7 of perforated metal or metallic gauze, adapted to divide said air into innumerable small bubbles and thus to promote oxidation.

Instead of being injected conjointly with the air, the mixture of solution and of calcium carbonate may of course be passed into the container separately and, in large apparatus, may be preferably fed between the trays, at various portions of the container. The apparatus may likewise be provided with a slowly moving agitator, having rotating vanes to sweep the face of the trays and to prevent precipitate from depositing thereon before the reaction is completed.

As the reaction progresses, it is noted that the liquid gradually assumes a brown tint due to the disintegration and oxidation of the ferrous salts in the form of a heavy precipitate of ferroso-ferric oxide mixed with the calcium sulphate whilst carbon dioxide is generated. With ferrous sulfate, which is the preponderant iron salt in the residual waters under consideration, the reaction is as follows:

$$6FeSO_4 + O_2 + 6CaCO_3 = 6CaSO_4 + 2Fe_3O_4 + 6CO_2$$

With ferrous chloride, usually present likewise, the reaction takes place with the intervention of sodium sulphate, which is always contained in considerable quantity in said waters:

$$6FeCl_2 + O_2 + 6CaCO_3 + 6Na_2SO_4 = 6CaSO_4 + 2Fe_3O_4 + 12NaCl + 6CO_2$$

Should ferric salts be present likewise, these will cause the precipitation of ferric hydrate, which settles with the ferroso-ferric oxide. On the other hand, the zinc salts do not react but remain in solution if there is no excess of calcium carbonate.

Air and calcium carbonate being preferably fed continuously, the reaction proceeds until it is ascertained, by the action of samples upon an indicator such as permanganate of potash, that the whole of the ferrous salts have been eliminated. After the removal of said ferrous salts, the precipitate-laden solution is discharged through a pipe 8 and is led to filters, or simply to decantation vats wherein the high specific gravity of the precipitate causes the same to settle quickly. Upon the liquid having separated, the remaining matter is washed with water to which a small quantity of sulphate of soda is preferably added, and is finally washed with water only. According whether yellow or red ochre is required, said matter is then dried or roasted.

The clear, decanted liquid contains the salts of zinc and of soda, and also of manganese if any is present. When this is the case the manganese may be precipitated as a hydrate by boiling the solution, to which an alkaline hypochlorite and an earth-alkaline carbonate may be added if necessary. In these circumstances, the action of the oxygen dissolved in the liquor causes the manganese to oxidize.

After the foregoing treatment, which may be omitted if the solution contains no manganese, said solution may be treated by the usual methods to extract zinc therefrom in the form of oxide, carbonate, lithopone and the like. The soda salts may be recovered by crystallization, after filtration.

The process hereinbefore described to exemplify a preferred application of my invention may of course be departed from in various ways. For example, the calcium carbonate used together with oxygen in order to precipitate iron might be replaced under like conditions by barium carbonate, and appropriate reagents such as sulphate of soda might be added to the solution if required, to create conditions ensuring the precipitation of iron in the form of ferroso-ferric oxide, my invention being limited only, in regard to its scope and its application, by the broad principle and general characteristics thereof, as set forth in the appended claims.

I claim:

1. A process for separating iron in useful form and ultimately recovering zinc from zinciferous solutions containing ferrous iron, the preliminary steps of removing said ferrous iron, which consists in introducing into said solution an alkaline earth carbonate in a finely divided condition, spraying air into said solution, while both the air and the solution are at atmospheric temperature, causing said air to be repeatedly intercepted and atomized as it rises within said solution in the presence of said alkaline earth carbonate, and thus causing iron to precipitate in said solution in the form of ferroso-ferric oxide $Fe_3O_4$, removing the precipitated ferroso-ferric oxide from the solution and subsequently separately removing the zinc from the remaining solution.

2. A process for separating iron in useful form and ultimately recovering zinc from zinciferous solutions having a ferrous iron content, which consists in continuously injecting into said solution maintained at atmospheric temperature alkaline earth carbonate in a fine state of division, continuously blowing into said solution an atomized stream of atmospheric air and causing said finely divided alkaline earth carbonate and said atomized air to pervade the mass of said solution, repeatedly intercepting said air and renewing its state of division through said solution, to promote the oxidation of the iron therein and the precipitation therefrom of such iron in the form of ferroso-ferric oxide $Fe_3O_4$, removing the precipitated ferroso-ferric oxide from the solution and subsequently separately removing the zinc from the remaining solution.

3. A process for separating iron in useful form and ultimately recovering zinc from zinciferous solutions having a ferrous iron content, which consists in continuously injecting into said solution maintained at atmospheric temperature an alkaline earth carbonate in a finely divided state, continuously blowing into said solution an atomized stream of atmospheric air, said finely divided alkaline earth carbonate and said atomized stream of air being injected in said solution conjointly, and causing said alkaline earth carbonate and said air to pervade and permeate every part of said solution, repeatedly renewing the atomization of said air as it ascends through said solution, to promote therein the precipitation of iron in the form of ferroso-ferric oxide $Fe_3O_4$, removing the precipitated ferroso-ferric oxide from the solution and subsequently separately removing the zinc from the remaining solution.

4. A process for separating iron and ultimately recovering zinc from zinciferous solutions containing ferrous iron, which consists in mixing an alkaline earth carbonate in a fine state of division with a portion of said solution, continuously injecting said portion of solution containing said finely divided alkaline earth carbonate into the remainder of said solution, dividing said solution into a plurality of shallow, superposed intercommunicating layers, continuously blowing into said solution at the level of each said layer an atomized stream of atmospheric air, causing said air to pass from one to another of said layers in a renewed state of division, and causing said finely divided alkaline earth carbonate and said atomized air to pervade every part of said solution to promote oxidation therein and the precipitation of iron therefrom in the form of ferroso-ferric oxide $Fe_3O_4$, removing the precipitated ferroso-ferric oxide from the solution and subsequently separately removing the zinc from the remaining solution.

5. A process for the separation of iron and the ultimate recovery of zinc from zinciferous residual waters originating from the wet treatment of cupriferous pyrites after the extraction of copper therefrom by cementation, which consists in injecting into said waters maintained at atmospheric temperature an alkaline earth carbonate in a finely divided state, blowing into said waters an atomized stream of atmospheric air, causing said finely divided alkaline earth carbonate and said atomized air to pervade the mass of said waters, repeatedly renewing the atomization of said air as it ascends through said solution to promote the oxidation thereof and the precipitation therefrom of iron in the form of ferroso-ferric oxide $Fe_3O_4$, decanting said waters, washing the precipitate first with an aqueous solution of sulphate of soda, and then with water, allowing said precipitate to dry, and independently removing the zinc content of the decanting waters.

6. A process for recovering iron in a useful form and separately recovering zinc from zinciferous solutions containing ferrous iron, the preliminary steps for first removing the ferrous iron, which consist in injecting into said solution maintained at atmospheric temperature, a supply of finely sub-divided alkaline-earth carbonate, injecting air in atomized condition into said solution while causing the air to be regularly and repeatedly intercepted and repeatedly atomized while rising through said solution in the presence of said alkaline-earth carbonate in order to precipitate the iron of the solution in the form of ferroso-ferric oxide $Fe_3O_4$, removing the precipitated ferroso-ferric oxide from said solution, and as a finishing step removing the zinc from said solution.

JOSEPH KEMP.